Patented May 12, 1942

2,282,683

UNITED STATES PATENT OFFICE 2,282,683

ELECTROCHEMICAL PREPARATION OF HALOGENATED ORGANIC HYDROXY COMPOUNDS

Miroslav Tamele, Oakland, Lloyd B. Ryland, El Cerrito, and Vanan C. Irvine, Oakland, Calif., assignors to Shell Development Company, San Francisco, Calif., a corporation of Delaware No Drawing. Application June 24, 1940,
Serial No. 342,126

19 Claims. (Cl. 204—81)

The present invention relates to the preparation of halogenated organic hydroxy compounds, and more particularly to the manufacture of aliphatic and/or alicyclic halohydrins. More specifically, the invention pertains to a novel process whereby halohydrins may be effectively and economically produced from unsaturated alcohols, and preferably from unsaturated aliphatic and/or alicyclic alcohols having at least some solubility in water. In one of its more specific embodiments, the invention includes a novel process for the halohydrination of unsaturated aliphatic alcohols generally possessing an unsaturated linkage in allylic position with respect to the carbinol group. In another specific embodiment, the present invention covers an improved process of treating water-soluble aliphatic and/or alicyclic unsaturated alcohols in aqueous solutions containing alkali halides to produce high yields and relatively high concentrations of the corresponding halohydrins, while, at the same time, inhibiting or at least greatly decreasing the formation of polyhalides and other undesirable by-products.

The prior art is replete with processes relating to the production of halohydrins by the interaction of unsaturated organic compounds with hypohalous acid or with aqueous halogen-containing solutions. In all of these reactions, a halogen and a hydroxy radical are chemically added to different carbon atoms of the unsaturated compound to form the corresponding halohydrin. In all of these chemical processes for the halohydrination of unsaturated organic compounds, relatively dilute aqueous hypohalous acid solutions are formed either by the interaction of a halogen, such as chlorine, bromine, etc., with water, or by a reaction of the halogen with an aqueous solution of a strong base with a weak acid such as sodium hypohalite. It is thus seen that the purely chemical halohydrination processes employed heretofore require the undesirable separate handling of free halogen. Also, in the purely chemical halohydrination processes one-half of the halogen introduced into the reaction system is wasted so far as the halohydrination step is concerned since this halogen goes to the formation of by-products, namely, hydrogen halides, alkali halides, chlorates, or the like, depending on the process employed for the manufacture of the hypohalous acid necessary for the chemical halohydrination. Furthermore, the purely chemical processes for the halohydrination of unsaturated organic compounds do not permit the production of relatively concentrated aqueous solutions of the halohydrins.

It is, therefore, one of the main objects of the present invention to avoid the above and other defects of the processes known and/or used heretofore, and to provide a process for the halohydrination of unsaturated aliphatic and/or alicyclic alcohols wherein it is unnecessary to employ free halogen for the production of the hypohalous acid. A further object is to provide a process wherein relatively high concentrations of halohydrins may be attained readily and economically without the necessity of using any special or separate concentrating or dehydrating steps. A still further object is to provide a process wherein aqueous solutions of the cheap and readily available alkali metal halides, such as sodium chloride, sodium bromide, potassium chloride, potassium bromide, and the like, may be employed for the halohydrination of unsaturated aliphatic and/or alicyclic alcohols. Another object is to provide an economical process for converting allyl alcohol and its homologues to the corresponding halohydrins and to obtain such halohydrins in relatively high concentrations without the necessity of subjecting the halohydrin solutions to any costly concentrating or dehydrating steps. Still other objects of the present invention will be apparent from the following description.

It has now been discovered that the above and other objects may be attained by subjecting the above-outlined and hereinbelow more fully described unsaturated aliphatic and/or alicyclic alcohols to anodic halohydrination. In other words, according to the present invention, the halohydrination of the unsaturated alcohols is effected by subjecting an aqueous solution or mixture of the unsaturated alcohol or alcohols and of an alkali metal halide to the action of a direct current which is conveyed through such solution or mixture between cathodic and anodic termini or electrodes disposed or immersed in said solution.

Representative examples of unsaturated aliphatic and alicyclic alcohols which may be treated in accordance with the process of the present invention are: allyl alcohol, methyl vinyl carbinol, crotyl alcohol, allyl carbinol, methyl allyl carbinol, cyclopentane-1-ol-1, 1-hydroxy-cyclohexene-1, cyclohexene-1-ol-3, 4-hydroxy-cyclohexene-1, 1-acetylenyl-cyclopentanol-1, methyl-2 methyl-cyclohexene-1 carbinol, and the like, and their homologues and analogues. It is to be noted that all of the above unsaturated aliphatic and alicyclic alcohols are water soluble to a greater or lesser degree. However, such water-solubility, although desirable, is not essential since unsaturated alcohols which are water-insoluble or substantially water-insoluble may also be halohydrinated according to the process of the present invention. Although the examples given above present compounds containing only one unsaturated linkage, it is obvious that the alcohols which may be electrochemically halohydrinated may have a greater number of unsaturated linkages which may be disposed in vicinal or non-vicinal and conjugated or non-conjugated relationship to each other. Also, the compounds may have either olefinic or acetylenic linkages or both, and may contain one or more carbinol radicals. It is to be further understood that the aliphatic and/or alicyclic unsaturated alcohols of the types presented hereinabove may have various alkyl, aryl and/or aralkyl substituents in place of one or more of the hydrogen atoms directly linked or attached to the various carbon atoms of the molecule.

Broadly stated, the invention comprises a novel process of producing halogenated organic hydroxy compounds or halohydrins from unsaturated aliphatic and/or alicyclic alcohols which are preferably at least somewhat soluble in water, this process comprising or including the step of subjecting a relatively dilute aqueous solution or mixture of the alcohol and of an alkali metal halide to the action of a direct electric current which is conveyed through the solution between cathodic and anodic termini or electrodes disposed in said solution. As will be described more fully hereinbelow, the cells or chambers containing the aforementioned electrodes and the reactants, are preferably provided or equipped with porous or semi-porous diaphragms which separate the zone containing the cathode or cathodes from the zone in which the anode or anodes are disposed.

In preparing the halogenated organic hydroxy compounds according to the present invention, the net result of the interaction of the three reacting bodies (namely, the unsaturated alcohol, the alkali metal halide and the water) under the influence of the direct electric current, is that the hydroxy radical of water and the halogen radical of the alkali metal halide are attached to the unsaturated alcohol to form the aforementioned halogenated organic hydroxy compound, this halohydrination being effected at or in the substantial vicinity of the anode. This reaction also yields alkali metal hydroxides which are formed in the substantial vicinity of the cathode or cathodes. Furthermore, hydrogen halide is also formed near the anode. Whether the halohydrination reaction according to the present invention is caused by a simultaneous or successive addition of the halogen and hydroxy radicals to the unsaturated alcohol, or whether there occurs an intermediate reaction during which hypohalous acid is formed, is not believed to be important or pertinent to the present process. It is to be noted, however, that the production of halohydrins in accordance with the process of the present invention by the anodic halohydrination of unsaturated alcohols in aqueous alkali metal halide solutions cannot be fully explained by a mere statement that the reaction produces a halogen gas which is then hydrolyzed and the hypohalous acid thus formed adds itself to an unsaturated linkage of the alcohol treated. This inability of explaining the reaction or reactions is predicated on a number of observations, such as the fact that under certain conditions small amounts of a gas, other than halogen, may be evolved in the vicinity of the anode, that the quantity of acid formed may be in excess of the amount of halohydrin produced, and that the yield of the halohydrins may be in an inverse relationship to the yield of hydrogen ions. Also, other facts, such as the effect of the concentration of the unsaturated alcohol on the yield of the halohydrins (which effect will be discussed more fully hereinbelow), cannot be fully explained. Therefore, any statements made in this respect would be mere postulations of various theories, most of which are not fully understood at the present time, and none of which explain all of the facts and effects of the reaction or reactions produced during the production of halohydrins in accordance with the process of the present invention.

The electrochemical halohydrination of the above-defined class of unsaturated alcohols may be effected according to the present process under widely different conditions depending on the starting materials, such as the specific alcohol and/or alkali metal halide, the desired halohydrin, etc. These variables will be described hereinbelow with particular reference to the effects thereof on the electrochemical chlorhydrination and bromhydrination of allyl alcohol to produce high yields of glycerol monochlorhydrin and glycerol monobromhydrin, respectively. It is to be understood, however, that the hereinbelow described variations of the operating conditions will also affect to a greater or lesser degree the effectiveness of the electrochemical halohydrination of the other unsaturated alcohols of the above-defined class.

The electrolysis according to this invention may be effected in any type of cell normally employed for the electrolytic production of chlorine, such a cell being ordinarily provided with one or more cathodic electrodes and one or more anodic electrodes immersed into the liquid subjected to the treatment. These cathodes and anodes may have the same or different effective areas. In order to obtain efficient distribution of current density, it is preferred to have the surfaces of the cathodes and of the anodes facing each other. Also, it is advantageous to arrange these electrodes so that the distances between the anodes, on the one hand, and the cathodes on the other, are substantially equal. Since the current density on the cathodes is not important and does not affect the efficiency of the process, it is possible to vary the area of the cathodes with respect to that of the anodes. The process may also be effectively realized by employing a cell (which, as will be brought out hereinbelow, is preferably equipped with a diaphragm), this cell containing a plurality of anodes which may be arranged, for example, equidistant from each other and from a single centrally disposed cathode. If a diaphragm is used in such case, this diaphragm may be either circular or polygonal in cross section, and should be disposed within the cell to divide it into a section containing the cathode and a section containing the anodes. Obviously, the number of the electrodes and their arrangement within the cell may vary. Also, the selection of the size, shape and disposition or arrangement of such electrodes will at least in part be affected by the size and type of the cell employed, the presence or absence of a diaphragm, the particular reactants subjected to the electric current, their concentration in the aqueous solution, as well as on other conditions.

As noted above, the cells employed for the halohydrination of unsaturated alcohols in accordance with the process of the present invention should be preferably provided with diaphragms disposed between the portion of the cell containing the anodes and the portion containing the cathode or cathodes. This is particularly true when the unsaturated alcohols are reacted with aqueous solutions of alkali metal halides. It was stated above that when unsaturated alcohols are subjected to the electrochemical halohydrination according to this process, hydrogen halides and alkali metal hydroxides are formed as by-products at or near the anodes and cathodes, respectively. Obviously, the electrolyte near the cathodes will become gradually more and more alkaline, while the pH value of the electrolyte near the anodes will gradually decrease (i. e. becomes more acidic). As will be shown in the examples presented hereinbelow, the current efficiency is considerably lower when the anolyte, i. e. the electrolyte near the anode or anodes, is neutral or alkaline, as compared to the current efficiency of a process in which the anolyte is acidic. In order to prevent the alkali metal hydroxide formed at or near the cathode from neutralizing the anolyte, or rendering it alkaline, it is therefore preferable to employ the aforementioned diaphragm which divides the cell into two compartments containing, respectively, the cathodic and anodic electrodes. This diaphragm ordinarily consists of a material which permits the passage of the ions therethrough due to the effect of the electric current, while reducing or inhibiting the diffusion of the products liberated or formed at the respective electrodes. These diaphragms may be made of various materials, such as Alundum, asbestos, etc., of various thicknesses depending on the material treated, the degree of porosity of the porous substance, and the degree of diffusion allowed or desirable. For instance, when employing asbestos, this thickness may vary from about 0.01 to 0.05 inch. However, greater or lesser thicknesses of the diaphragm may be used. Obviously, an increase in the diaphragm thickness, although decreasing the diffusion of the liquids therethrough, will increase the electric power necessary for the passage of the electric current between the electrodes. This, in turn, increases the amount of current consumed in the form of heat, thus decreasing somewhat the efficiency of the process. Therefore, in each individual case, in determining the optimum or desired thickness of a given diaphragm, it is necessary to balance all of the factors which affect energy efficiency and the yield of the desired halogenated organic hydroxy compounds.

Both the cathode and anode electrodes may be made or constructed of any electrically conductive material which is inert to the action of the reactants and the reaction products. Representative materials which may be employed for the manufacture of both the cathodic and anodic electrodes include carbon, graphite, platinum and the like. Also, graphitic electrodes coated with other conductive materials such as platinum, may be employed effectively. Although in some instances non-porous electrodes, such as graphite electrodes coated or impregnated with resins, may be employed, the use of such electrodes usually lowers the current efficiency to such an extent that the operations may become impractical or uneconomical. Frequently, when employed for the electrochemical halohydrination in accordance with the process of the present invention, the electrodes become coated with water-insoluble organic matter the presence of which lowers the current efficiency of the process. This organic matter may be removed from the electrodes by various means, such as heating the electrodes to elevated temperatures, reversing the polarity at the electrodes, etc. The use of graphite electrodes permits the halohydrination to proceed when the halohydrin concentration in the electrolyte is considerably greater than that efficiently attainable when, for example, platinum electrodes are employed. Nevertheless, the halohydrination according to the present process may be effected with electrodes made of all types of electrically conductive materials which are not dissolved anodically.

Although the concentration of the unsaturated aliphatic and/or alicyclic alcohols in the electrolyte may vary within relatively wide limits, it has been unexepectedly discovered that both the conversion rate to the corresponding halohydrins, as well as the electric current efficiency, will increase with a decrease in the alcohol concentration. In fact, the best results, at least so far as the chlorhydrination of allyl alcohol is concerned, were obtained when the alcohol concentration was maintained at from about 0.01% to about 0.5% and preferably below about 0.05% by weight of the electrolyte. Obviously, the present process may be effected with higher alcohol concentrations, such as those ranging up to about 1.5% by weight, or higher. However, at these higher alcohol concentrations, the current efficiency becomes quite low. Also, the increased concentration of the unsaturated alcohol in the electrolyte apparently favors its oxidation, as this is shown by the detection of acrolein in the reaction products obtained when relatively high concentrations of allyl alcohol are subjected to halohydrination according to the present process. In general, it may be said that the use of these relatively higher concentrations of the unsaturated alcohol, tends to favor the occurrence of different electrochemical reactions. Nevertheless, such high alcohol concentrations do not prevent the formation of halohydrins. In practice, in order to obtain the best yields of the desired halohydrins, while maintaining relatively high current efficiencies, it is therefore advantageous to maintain a very low alcohol concentration in the aqueous alkali metal halide solution, and to continuously or intermittently add further quantities of the alcohol at a rate commensurate with its consumption or conversion into the corresponding halohydrin.

The concentration of the alkali metal halide in the aqueous solution employed as the electrolyte for the electrochemical halohydrination of the defined class of unsaturated alcohols may also vary within relatively wide limits. For instance, in the chlorhydrination of bromhydrination of allyl alcohol, the optimum range of the concentration of alkali metal chloride or bromide may be betwen about 0.1 M and 3 M. It may be generally stated that the use of higher concentrations of the alkali metal halide favors the formation of dihalohydrins. In other words, with an increase in the mol concentration of the alkali metal halide, the ratio of monohalohydrins to dihalohydrins decreases. This may be readily seen from the following results which were obtained during the bromhydrination of allyl alcohol according to the present process. The four experiments, the results of which are given below, were effected under identical conditions except for the concentration of the sodium bromide in the aqueous electrolyte.

| Sodium bromide concentration | Allyl alcohol distribution | |
|---|---|---|
| | Mono-bromhy-drins | Di-bromhy-drins |
| | Percent | Percent |
| 2.0 M | 78.0 | 22.0 |
| 0.97 M | 87.5 | 12.5 |
| 0.20 M | 97.9 | 2.1 |
| 0.10 M | 93.9 | Nil |

The distribution of the allyl alcohol between the two bromhydrins was calculated from the number of mols of alcohol consumed and the number of equivalents of hydrolyzable bromine, it being assumed that there was complete (100%) conversion to bromhydrins. The current efficiency in all cases was substantially the same. A comparison of the results supports the above statement that a decrease in the mol concentration of the alkali metal halide increases the ratio of monohalohydrins to dihalohydrins. However, when excessively low alkali metal halide concentrations are employed there is a tendency toward side-reactions.

The halohydrination reaction may also be varied considerably. It appears that temperatures below normal apparently favor the formation of monohalohydrins. However, the use of such temperatures appears to lower somewhat the current efficiency of the electrolysis. Although good yields of halohydrins were obtained by effecting the reaction at room temperatures (20° C. to 30° C.), efficient halohydrination may be effected at temperatures between about 10° C. and 50° C. or higher.

The current density at the cathode or cathodes may also vary within relatively wide limits without any apparent effect on the yield of the desired halohydrins. For instance, cathodic current densities in the range of from about 5 to 50 amperes per square decimeter of the cathode surface, even at or near the abovementioned upper temperature limit of 50° C., did not appear to have any influence on the halohydrination of unsaturated aliphatic and/or alicyclic alcohols according to the process of the present invention. On the other hand, the anodic current density appears to have at least some effect on the yield of the desired product as well as on the electric current efficiency. Thus, it was found that excessively high current densities at the anodic electrodes lower the electric current efficiency and the yield of the halohydrins. The optimum range of such anodic current densities will vary depending on a number of different operating conditions including the specific type of unsaturated alcohol to be treated, concentrations employed, operating temperature, etc. Generally, it may be stated that the use of anodic densities between about 2 and 25 amperes per dm.$^2$ of anodic surface, and preferably in the neighborhood of from 5 to 10 amperes per dm.$^2$ of such surface, produce excellent results during the halohydrination of allyl alcohol or of its homologues. However, somewhat lower and higher current densities may be used without materially affecting the yield of chlorhydrins or the electric current efficiency.

The term "current efficiency" or "electric current efficiency" as employed herein denotes the ratio of the number of mols of substance transformed to the amount of electricity employed therefor. For example, the alcohol current efficiency of a given halohydrination operation would thus be the ratio of the number of mols of the unsaturated alcohol used up in the cell divided by the amount of electricity actually employed or consumed. Since in the halohydrination of unsaturated alcohols according to the present process, two faradays of electricity are used to form one mol of halohydrin, only one-half of the electricity actually employed is considered in calculating the aforementioned current efficiency.

In view of the above discoveries, the invention may be stated to reside further in a process for the electrochemical halohydrination of unsaturated alcohols of the class described hereinabove, this process comprising or including the steps of providing a diaphragm-containing cell with an aqueous solution of an alkali metal halide, introducing the unsaturated alcohol thereinto, subjecting the solution or mixture thus formed to the action of a direct electric current to produce the desired halohydrins in the vicinity of the anode or anodes, and maintaining the alcohol and halide concentrations in the electrolyte substantially constant (or within certain limits described above) by the continuous or intermittent addition of fresh quantities thereof commensurate with their consumption. Preferably, the mol concentration of the alkali metal halide is maintained between about 0.1 M and 3 M, while the concentration of the unsaturated alcohol should be preferably quite low, the optimum concentration of allyl alcohol in the electrolyte being below about 0.05% by weight.

Aside from the fact that the present process obviates the necessity of separation and handling of free halogen normally required for the preparation of halohydrins according to the purely chemical processes known and used until the present time, the electrochemical halohydrination of unsaturated aliphatic and/or alicyclic alcohols according to this invention is also advantageous in that it allows the preparation of halogenated organic hydroxy compounds in considerably stronger solutions or concentrations than heretofore attainable. This, obviously, facilitates the recovery of the products in a pure state by decreasing the quantity or volume of solutions to be treated to obtain a given quantity of the desired halohydrin. When halohydrins are produced by the process of the present invention, it is possible to obtain halohydrin solutions of greater concentrations than those attainable by the purely chemical halohydrination processes. This decreases the amount of inorganic salts formed as a by-product, thereby further increasing the efficiency of the present process. Although the current efficiency drops somewhat when the halohydrin concentrations in the electrolyte become very high, it was determined that concentrations of between about 15% and 20% or higher are attainable without any influence or effect on the current efficiency, and therefore on the economy of the process. Although at higher concentrations, a small decrease in the current efficiency was noted, in some cases it may be advantageous to sacrifice the electric current efficiency in order to obtain higher halohydrin concentrations.

The present process is applicable to electrochemical treatment of unsaturated alcohols with any or all alkali metal halides to produce the corresponding halogenated organic hydroxy compounds or halohydrins. However, the use of certain alkali metal halides may be preferred. For example, although allyl alcohol or the like may be effectively chlorhydrinated the production of the corresponding bromhydrins by using alkali metal bromides, such as sodium bromide, is preferred for the following reasons. The electrochemical halohydrination with the alkali metal chlorides, at least in some instances, causes the formation of chlorates and other by-products. On the other hand, these side reactions are absent when the electrolysis is effected with, for example, sodium bromide, particularly when the anolyte is maintained acidic. This is due to the fact that any bromates which might be formed are immediately reduced to bromine when in the presence of acid solutions of bromide ions. Furthermore, particularly in the case of the bromhydrination of allyl alcohol, a relatively large proportion of the reaction products consists of the dibromhydrin which has only a limited solubility in water. Therefore, during such electrolysis, a practically anhydrous phase, (consisting of a mixture of the dibromhydrin and monobromhydrin) separates out so that the concentration of the aqueous phase does not increase above about 1.0 N equivalents of hydrolyzable bromine per liter. Therefore, by proper additions of the alkali metal bromide and of the unsaturated alcohol, and by an intermittent or continuous withdrawal of this anhydrous phase, it is possible to effect the reaction for relatively long periods without the necessity of interrupting the operations of the cell. Also, the bromhydrins are hydrolyzed to the corresponding polyhydroxy organic compounds more readily than the chlorhydrins so that it is possible to conduct the electrolysis in such a manner that a substantial portion of the bromhydrins is hydrolyzed even at room temperature by the alkali hydroxide (caustic) formed at the cathode. A corresponding portion of the bromide ion is thus returned to the electrolyte for further bromhydrination according to the present process. This hydrolysis, when effected in cells provided with diaphragms, may be effected either intermittently or continuously. For example, the diaphragm may be periodically withdrawn to allow the caustic to pass from the catholyte into the anolyte. In the alternative, means may be provided for such conveyance of the liquid from one side of the diaphragm to the other. Furthermore, the diaphragm may be constructed so that its porosity will allow the diffusion of the alkali metal hydroxide into the anolyte. The invention, therefore, includes a process for the production of polyhydroxy organic compounds by subjecting unsaturated alcohols of the defined class to the action of a direct electric current in the presence of an alkali metal halide thereby forming the corresponding halohydrins, and causing the alkali metal hydroxide, formed at or near the cathode, to hydrolyze said halohydrins to the corresponding polyhydroxy compounds. As noted, this phase of the present invention is preferably effected in connection with the electrochemical bromhydrination with alkali metal bromides, particularly in cells provided with diaphragms which separate the cathode-containing portion from that containing the anodes. Obviously, the hydrolysis step may be effected in other vessels into which the halohydrins may be conducted, this hydrolysis being realized either with the alkali metal hydroxide formed in the catholyte, or with other caustic obtained from an outside source.

The following examples will serve to illustrate various phases of the present invention, it being understood that there is no intention of being limited by any details of operation, such as temperature, concentrations of the starting materials and of final products, type of diaphragm employed, if any, current densities, etc., the invention being co-extensive in scope with the appended claims.

*Example I*

A cell containing four graphite anodes, nickel cathode and a diaphragm of parchment paper, was filled with about 13.3 liters of 2.03 molar solution of sodium bromide. The anodic compartment contained about 5.8 liters of this electrolyte, while the remainder was in the cathode compartment. Allyl alcohol was then introduced in a quantity equal to about 0.2% by weight of the electrolyte, this concentration being maintained by the addition of fresh quantities of this alcohol as it was consumed in the electrolysis step which was operated at 87 amperes and an average voltage of about 13 volts. The current densities were equal to about 15 amperes and 14 amperes per square decimeter of the anode and cathode surfaces, respectively. The bromhydrination was effected at a temperature of about 25° C., and was continued until about 459 ampere-hours of electricity had been passed through the electrolyte. Throughout this electrochemical reaction the anolyte was maintained slightly acidic (a pH of about 5). The alcohol current efficiency was found to be equal to about 97.5%. At the end of the electrolysis, the bromhydrins were removed from the cell, diluted with water and hydrolyzed with sodium bicarbonate at a temperature of about 150° C. and a pressure of about 200 pounds per square inch gauge. The reaction mixture thus produced was then subjected to vacuum distillation to recover the glycerin, the yield of which was 78.2% as calculated on the basis of the allyl alcohol consumed. About 7.4% of the alcohol was recovered as a heavy polymeric fraction.

*Example II*

A cell containing an Alundum diaphragm was provided with a graphite anode and a platinum cathode. About 100 cc. of a two molar sodium chloride solution were introduced into the anode compartment. The cathode compartment also contained the same salt solution. Allyl alcohol was introduced in a quantity equal to about 0.08% by weight of the electrolyte. The solution was then subjected to the action of an electric current (0.50 ampere at 5.5 volts). The anodic current density was 8.0 amperes per $dm.^2$. The electrolysis was conducted for one hour during which time about 0.019 faradays of electricity were passed through the electrolyte. The allyl alcohol concentration was maintained substantially constant by addition of fresh quantities thereof commensurate with its consumption. An analysis of the reaction products showed that about 0.0087 mol of alcohol were consumed. The alcohol current efficiency was 92.0%. The anolyte contained about 0.00881 mol of hydrolyzable chloride and about 0.007 mol of acid produced as a by-product.

Example III

A two (2) molar sodium bromide solution was introduced into a two liter cell provided with an Alundum diaphragm which divided the cell into an anode and a cathode compartment, each containing carbon electrodes. Allyl alcohol was introduced continually to maintain an average concentration of about 0.3% by weight. The direct electric current of 13.0 volts was passed through the solution until about 2.76 faradays of current were used. The electric current densities were equal to 14.5 and 16.4 amperes per square decimeter of anode and cathode surfaces, respectively. The reaction temperature was about 25° C. During the reaction, the catholyte was renewed from time to time to prevent the excessive concentration of the hydroxide ion therein. This inhibited the transference of these hydroxide ions through the diaphragm into the anolyte. This anolyte was thus maintained acidic. It was found that the alcohol current efficiency was equal to about 99.7%. The bromhydrins in the reaction mixture (anolyte) were then hydrolized by reacting them with sodium bicarbonate under atmospheric pressure. An analysis of the final reaction product showed that about 88.2% of the allyl alcohol employed were thus converted to glycerine.

Example IV

In order to show the effect of concentration of the unsaturated alcohol during electrolysis in accordance with the process of the present invention, a series of tests was made in a small cell constructed by installing an Alundum thimble in the center of 400 cc. glass beaker. This cup formed the anode compartment into which about 100 cc. of a 2 molar solution of sodium chloride were introduced. The surrounding cathode compartment was then filled with the same solution to the same level. The electrodes were of platinum and were immersed about 2 cm. below the surface. In each case, the electrolysis was conducted for exactly one hour, the current density being about 50 amperes per square decimeter of electrode surface employed. The allyl alcohol concentration was varied from test to test, this concentration ranging from about 0.1 to about 1.5 grams per 100 cc. of the sodium chloride solution used. The following table shows the current efficiencies and the conversions of the allyl alcohol (as measured by the percent equivalents of hydrolyzable chlorine formed):

| Allyl alcohol concentration | Current efficiency | Conversion |
|---|---|---|
| 0.1 | 96.0 | 98.0 |
| 0.5 | 87.0 | 93.0 |
| 1.5 | 68.0 | 87.5 |

Example V

Allyl alcohol was subjected to electrolysis in a cell provided with an Alundum diaphragm, this cell containing a two mol solution of sodium bromide. The current densities were 15 and 17 amperes per $dm.^2$ of anode and cathode surfaces, respectively. The total current consumption was 8.6 faradays. During the electrolysis, the caustic in the catholyte was allowed to build up until an appreciable portion of the current passing through the solution was carried by the hydroxide ions. These ions, entering the anode compartment, were immediately consumed in hydrolyzing a portion of the saturated solution of the bromhydrins. The pH of the anolyte was thus maintained in the neighborhood of 9 although by the end of the test, it rose to a pH of about 12. After the termination of the hydrolysis, the catholyte (the sodium hydroxide concentration of which was found to be 2.4 normal) was slowly added in batches to the anolyte which was maintained at a temperature of between about 50° C. and 80° C. The reaction product was found to contain about 50% glycerin as calculated on the allyl alcohol employed.

Although the invention has been described with particular reference to the electrochemical halohydrination of allyl alcohol, it is to be understood that the present process is equally applicable for the conversion of other unsaturated aliphatic and/or alicyclic alcohols to the corresponding halogenated organic hydroxy compounds and/or to organic polyhydroxy compounds. Also, although the reactions described herein were all effected at atmospheric pressures, it is possible to operate at elevated and even reduced pressures.

We claim as our invention:

1. A process for the production of glycerine which comprises forming an aqueous solution containing sodium bromide in a molar concentration of about 2 and allyl alcohol in a quantity between about 0.01% and about 0.05% by weight of the solution, disposing said solution in an electric cell provided with anode and cathode electrodes and with a diaphragm dividing said cell into an anode-containing zone and a cathode-containing zone, subjecting said solution in said cell to the action of a direct electric current of a current density of between about 2 and 25 amperes per square decimeter of anodic surface employed, maintaining the aforementioned sodium bromide and allyl alcohol concentrations by introducing additional quantities thereof as the same are utilized in the formation of glycerol bromhydrins in the anode-containing zone and of sodium hydroxide in the cathode-containing zone, and reacting the sodium hydroxide thus formed with the glycerol bromhydrins, thereby forming glycerine.

2. A process for the production of glycerol bromhydrins which comprises forming an aqueous solution containing sodium bromide in a molar concentration of between about 0.1 and 3 and allyl alcohol in a quantity below 0.05% by weight of the solution, disposing said solution in an electric cell divided by means of a diaphragm into a cathode-containing zone and an anode-containing zone, subjecting said solution in said cell to the action of a direct electric current of a current density of between about 2 and 25 amperes per square decimeter of anodic surface employed, maintaining the aforementioned sodium bromide and allyl alcohol concentrations by introducing additional quantities thereof as the same are utilized, maintaining the solution in the anode-containing zone in an acidic state, and removing the glycerol bromhydrins from said anode-containing zone.

3. The process according to claim 2, wherein the glycerol bromhydrins are converted to glycerine by subjecting the bromhydrins to the action of an alkali under hydrolyzing conditions.

4. A process for the production of glycerol halohydrins which comprises forming an aqueous solution containing an alkali metal halide in a molar concentration of between about 0.1 and 3 and allyl alcohol in an effective amount such that its concentration is below 0.05% by weight of the solution, disposing said solution in a cell divided by means of a diaphragm into a cathode-containing zone and an anode-containing zone, subjecting said solution to the action of an electric current conveyed between the electrodes under conditions whereby the current density is between about 2 and 25 amperes per square decimeter of anodic surface employed, and maintaining the aforementioned halide and alcohol concentrations by addition of fresh quantities thereof as the same are utilized.

5. The process according to claim 4, wherein the solution in the anode-containing zone is maintained in an acidic state during the electrolysis, and wherein the reaction is effected at a temperature of between about 10° C. and 50° C.

6. A process for the production of glycerol halohydrins which comprises subjecting an aqueous alkali metal halide solution containing between about 0.01% and 0.5% by weight of allyl alcohol to the action of a direct electric current in a divided cell provided with an anode and a cathode.

7. A process for the production of bromhydrins which comprises forming an aqueous alkali metal bromide solution of a molar concentration of between about 0.1 and 3, introducing an unsaturated water-soluble aliphatic alcohol into said solution in an effective amount such that its concentration is below 0.05% by weight of said solution, subjecting said solution to the action of a direct electric current transmitted through said solution between an anode and a cathode disposed therein under conditions whereby the current density is between about 5 and 10 amperes per square decimeter of anodic surface employed, maintaining the alcohol concentration in said solution by introducing additional quantities thereof as they are used in the electrolysis, and removing the bromhydrins thus formed.

8. The process according to claim 7, wherein the electrolysis step is effected in a cell divided by means of a diaphragm into a cathode-containing zone and an anode-containing zone, and wherein the solution in the anode-containing zone is maintained in an acidic state during the electrolysis step.

9. A process for the production of halohydrins which comprises the steps of forming an aqueous alkali metal halide solution of a molar concentration of between about 0.1 and 3, introducing an unsaturated aliphatic alcohol into said solution in an effective amount such that its concentration is below 0.05% by weight of the solution, subjecting said mixture to the action of a direct electric current transmitted through said mixture, and maintaining the halide and alcohol concentrations by introducing fresh quantities thereof during the electrolysis step, thereby producing high yields of halohydrins while decreasing the tendency of side reactions.

10. A process for the production of halohydrins which comprises forming an aqueous solution containing an alkali metal halide in a molar concentration of between about 0.1 and 3 and an unsaturated aliphatic alcohol in a concentration of between about 0.01% and 0.5% by weight of the solution, and subjecting the mixture thus formed to the action of a direct electric current transmitted through said solution between an anode and a cathode electrodes disposed therein.

11. The process according to claim 10, wherein the electric current transmitted through the aqueous mixture is of a density equal to between about 2 and 25 amperes per square decimeter of anodic surface employed.

12. The process according to claim 10, wherein the mixture is subjected to the action of the electric current in a cell divided by means of a diaphragm into a cathode-containing zone and an anode-containing zone, and wherein the mixture in the anode-containing zone is maintained acidic throughout the halo-hydrination step.

13. A process for the production of halohydrins which comprises forming an aqueous solution containing an alkali metal halide in a molar concentration of between about 0.1 and 3, introducing an effective amount of an unsaturated aliphatic alcohol into said solution, and subjecting the mixture thus formed to the action of a direct electric current transmitted through said solution between at least one cathode and at least one anode disposed in said solution.

14. The process according to claim 13 wherein the aqueous mixture is subjected to electrolysis in a cell divided with a diaphragm adapted to pass ions therethrough due to the effect of the electric current while simultaneously inhibiting diffusion.

15. In a process for the production of halogenated organic hydroxy compounds, the steps of introducing an aqueous solution of an alkali metal halide and of an unsaturated alcohol in a concentration of between about 0.01% and 0.5% by weight of the solution into an electric cell divided by means of a diaphragm into at least two zones containing electrodes, and subjecting said mixture to the action of a direct electric current transmitted through said solution between the anode and cathode electrodes.

16. The process according to claim 15, wherein the electric current transmitted through the aqueous mixture is of a density equal to between about 2 and 25 amperes per square decimeter of the anodic electrode surface employed.

17. In a process for the production of halogenated organic hydroxy compounds, the step of subjecting an aqueous solution of an alkali metal halide and between about 0.01% and 0.5% by weight of an unsaturated alcohol soluble therein to the action of an electric current.

18. The process according to claim 17 wherein the solution is subjected to the action of the electric current in a cell divided by means of a diaphragm into a plurality of zones each containing an electrode.

19. The process according to claim 17, wherein the solution is subjected to electrolysis in a divided cell containing a cathode and anode electrodes and wherein the solution in the anode-containing portion of the cell is maintained acidic during the electrolysis step.

MIROSLAV TAMELE.
LLOYD B. RYLAND.
VANAN C. IRVINE.